(12) United States Patent
Kong et al.

(10) Patent No.: US 9,859,995 B2
(45) Date of Patent: Jan. 2, 2018

(54) SYSTEM AND METHOD FOR TESTING MULTI-USER, MULTI-INPUT/MULTI-OUTPUT SYSTEMS

(71) Applicant: Keysight Technologies, Inc., Minneapolis, MN (US)

(72) Inventors: Hong-Wei Kong, Beijing (CN); Ya Jing, Beijing (CN); Xu Zhao, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/001,164

(22) Filed: Jan. 19, 2016

(65) Prior Publication Data

US 2016/0212641 A1 Jul. 21, 2016

(30) Foreign Application Priority Data

Jan. 19, 2015 (CN) .......................... 2015 1 0025951
Mar. 19, 2015 (CN) .......................... 2015 1 0122492

(51) Int. Cl.
*H04W 24/00* (2009.01)
*H04B 17/00* (2015.01)
*H04B 17/391* (2015.01)
*H04B 7/0413* (2017.01)

(52) U.S. Cl.
CPC ..... *H04B 17/0087* (2013.01); *H04B 17/3911* (2015.01); *H04B 7/0413* (2013.01)

(58) Field of Classification Search
CPC ............ H04B 17/0087; H04B 17/3911; H04B 17/0413
See application file for complete search history.

(56) References Cited

U.S. PATENT DOCUMENTS

| 2008/0056340 | A1 | 3/2008 | Foegelle |
| 2012/0100813 | A1* | 4/2012 | Mow .................. H04B 17/3911 455/67.12 |
| 2013/0202089 | A1* | 8/2013 | Schubert .............. G01V 5/0025 378/86 |

FOREIGN PATENT DOCUMENTS

| EP | 2512173 A1 | 10/2012 |
| KR | 1020130062764 A | 6/2013 |
| KR | 101286023 | 7/2013 |

OTHER PUBLICATIONS

Combined Search and Examination Report dated Jul. 13, 2016 in UK Patent Application No. GB 1600714.8.

(Continued)

*Primary Examiner* — Barry Taylor

(57) ABSTRACT

A test system for testing a device under test includes: a signal processor configured to generate a plurality of independent signals and to apply first fading channel characteristics to each of the independent signals to generate a plurality of first faded test signals; a test system interface configured to provide the plurality of first faded test signals to one or more signal input interfaces of the device under test (DUT); a second signal processor configured to apply second fading channel characteristics to a plurality of output signals of the DUT to generate a plurality of second faded test signals, wherein the second fading channel characteristics are derived from the first fading channel characteristics; and one or more test instruments configured to measure at least one performance characteristic of the DUT from the plurality of second faded test signals.

21 Claims, 7 Drawing Sheets

(56) References Cited

OTHER PUBLICATIONS

English language abstract of KR201362764, published Jun. 13, 2013.
English language abstract of KR101286023, published Jul. 19, 2013.
Intention to Grant under Section 18(4) dated May 19, 2017 in UK Patent Application No. GB1600714.8, 2 pages.

* cited by examiner

SYSTEM AND METHOD FOR TESTING MULTI-USER, MULTI-INPUT/MULTI-OUTPUT SYSTEMS

CROSS-REFERENCES TO RELATED APPLICATIONS

This patent application claims the priority benefit under 35 U.S.C. 119(b) from commonly-owned Chinese Patent Application 201510025951.9, filed on 19 Jan. 2015 in the names of Hong-Wei Kong et al., and commonly-owned Chinese Patent Application 201510122492.6, filed on 19 Mar. 2015 in the names of Hong-Wei Kong et al., the disclosures of which are incorporated herein in their entirety by reference.

BACKGROUND

Communication demands, and particularly wireless communication demands, continue to increase. Next generation wireless communication systems, commonly referred to as "5G communication systems" are being developed, to meet these demands. One important technology to be adopted by 5G communication systems involves the use of base stations which have a large number of input and outputs (sometimes referred to as a massive MIMO system) to serve a large number of communication users. Massive MIMO uses a large excess of antennas and time division duplex operation to serve multiple active user terminals at the same time. Extra antennas focus energy into ever-smaller regions of space to bring huge improvements in throughput and radiated energy efficiency. Such massive MIMO systems may have hundreds of transmit (Tx) and receive (Rx) channels and corresponding RF antennas.

In general communication systems and devices, like other electronics, require testing and, in some cases, calibration. However, testing and calibration can present challenges in the case of a multi-user massive MIMO communication system or terminal which includes a large number of input and outputs. For example, the system performance evaluation depends on the wireless channel characteristics which can be different for different users and different inputs and outputs at the same time. So proper solutions for testing multi-user massive MIMO performance are needed.

Thus it would be desirable to provide a more convenient and more reliable method and system to test and calibrate the performance of a multi-user, multi-input/multi-output communication system or device.

SUMMARY

In one aspect, a method is provided for testing a multi-input, multi-output (MIMO) device under test (DUT). The method comprises: generating a plurality of independent uplink signals; applying corresponding uplink fading channel characteristics to each of the independent uplink signals to generate a plurality of faded independent uplink signals; selectively connecting the plurality of faded independent uplink signals to a plurality of RF ports configured to transmit RF signals to at least one of a plurality of inputs of the MIMO DUT in response to at least one control signal; receiving at the plurality of RF ports a plurality of downlink signals from the MIMO DUT; applying downlink fading channel characteristics to at least one of the downlink signals, to produce therefrom at least one faded downlink signal; and measuring at least one performance characteristic of the MIMO DUT from the at least one faded downlink signal.

In some embodiments, the method further comprises applying different uplink fading channel characteristics to each of the independent uplink signals to generate the plurality of faded independent uplink signals.

In some embodiments, the method further comprises: supplying the plurality of faded independent uplink signals from the plurality of RF ports to a plurality of probe antennas via a corresponding plurality of RF cables; and transmitting the plurality of faded independent uplink signals wirelessly from the probe antennas to the MIMO DUT.

In some embodiments, the method further comprises supplying a first one of the plurality of faded independent uplink signals to a first group of the plurality of probe antennas, and supplying a second one of the plurality of faded independent uplink signals to a second group of the plurality of probe antennas, wherein at least one of the probe antennas included in the first group is not included in the second group.

In some embodiments, the MIMO DUT is disposed within an anechoic chamber, the method further comprising transmitting the plurality of faded independent uplink signals wirelessly from the probe antennas to the MIMO DUT within the anechoic chamber.

In some embodiments, the method further comprises: receiving at the probe antennas the plurality of downlink signals transmitted wirelessly from the MIMO DUT within the anechoic chamber; and supplying the plurality of downlink signals from the plurality of probe antennas to the plurality of RF ports via the corresponding plurality of RF cables.

In some embodiments, the downlink fading channel characteristics applied to at least one of the downlink signals are the same as the uplink fading channel characteristics applied to a corresponding one of the independent uplink signals.

In some embodiments, the method further comprises: extracting data from the at least one of the downlink signals; and adjusting at least one characteristic of a corresponding one of the plurality of independent uplink signals in response to the extracted data.

In some embodiments, the at least one characteristic of the corresponding one of the plurality of independent uplink signals includes a modulation type employed to generate the corresponding one of the plurality of independent uplink signals.

In some embodiments, measuring at least one performance characteristic of the MIMO DUT includes measuring at least one of: a signal-to-interference-and-noise ratio (SINR), a signal-to-noise ratio, a bit error rate (BER), a block error rate (BLER), a data throughput, and a packet error rate for the at least one of the downlink signals.

In some embodiments, the plurality of independent uplink signals are baseband signals, and wherein applying corresponding uplink fading channel characteristics to each of the independent uplink signals to generate a plurality of faded independent uplink signals comprises: converting the plurality of baseband independent uplink signals to a plurality of plurality of independent RF uplink signals; and applying the corresponding uplink fading channel characteristics to each of the plurality of independent RF uplink signals to generate the plurality of faded independent uplink signals.

In another aspect, a test system is provided for testing a multi-input, multi-output (MIMO) device under test (DUT). The test system comprises: one or more signal processors configured to generate a plurality of faded independent uplink signals; a switch network including, a plurality of first ports connected to the one or more signal processors and configured to receive the plurality of faded independent uplink signals, at least one switch, and a plurality of second ports configured to transmit RF uplink signals to the MIMO DUT, and at least one control input configured to receive at least one control signal for controlling the at least one switch to selectively supply to the second ports the plurality of faded independent uplink signals received at the plurality of first ports, wherein the switch network is further configured to receive at the plurality of second ports a plurality of downlink signals from the MIMO DUT via the plurality of probe antennas and to selectively provide the downlink signals to the first ports in response to at least one control signal, and wherein the one or more signal processors are further configured to apply corresponding downlink fading channel characteristics to at least one of the downlink signals, to produce therefrom at least one faded downlink signal, and to measure at least one performance characteristic of the MIMO DUT from the at least one faded downlink signal.

In some embodiments, where the MIMO DUT has a plurality of antennas, the test system further comprises a plurality of probe antennas which are arranged to transmit the RF uplink signals to at least one of the plurality of antennas of the MIMO DUT.

In some versions of these embodiments, the plurality of probe antennas are arranged to transmit the RF signals to the plurality of antennas of the MIMO DUT within an anechoic chamber.

In some embodiments, the one or more signal processors comprise: a multi-user signal emulator configured to generate a plurality of independent baseband uplink signals; and a channel emulator configured to convert the independent baseband uplink signals to independent RF uplink signals, and to apply corresponding uplink fading channel characteristics to each of the independent RF uplink signals to generate the plurality of faded independent uplink signals.

In some embodiments, the one or more signal processors comprise: a multi-user signal emulator configured to generate a plurality of independent baseband uplink signals; and a channel emulator configured to apply corresponding uplink fading channel characteristics to the independent baseband uplink signals to generate the plurality of faded independent baseband uplink signals, and to convert the faded independent baseband uplink signals to RF frequencies to produce the plurality of faded independent uplink signals.

In some embodiments, the one or more signal processors comprise: a multi-user signal emulator configured to generate a plurality of independent baseband uplink signals, wherein the multi-user signal emulator includes: a signal generator configured to generate a plurality of independent baseband uplink signals; a signal receiver configured to receive the at least one faded downlink signal; and a performance measurement subsystem configured to measure at least one performance characteristic of the MIMO DUT from the at least one faded downlink signal.

In some embodiments, the multi-user signal emulator further includes a sounding signal generator configured to generate a sounding signal to be transmitted to the MIMO DUT, the sounding signal being usable by the MIMO DUT to determine uplink fading channel characteristics for at least one of the faded independent uplink signals.

In some embodiments, the test system further comprises a controller comprising: a processor; and memory storing instructions for causing the processor to control at least one operating parameter of the one or more signal processors and at least one operating parameter of the switch network.

In some embodiments, the controller further comprises a graphical user interface configured to receive user input from a user and in response to the user input to control the at least one operating parameter of the one or more signal processors and the at least one operating parameter of the switch network.

In some embodiments where the MIMO DUT has a plurality of RF input/output terminals, the test system further includes an RF coupling network connected to the first ports and second ports of the switch network and further configured to be connected to the RF input/output terminals of the MIMO DUT, wherein the RF coupling network is configured to couple the plurality of uplink signals from the switch network to the RF input/output terminals of the MIMO DUT, and is further configured to couple the plurality of downlink signals from the MIMO DUT to the switch network.

In some variations of these embodiments, the RF coupling network comprises: an RF coupler subsystem comprising a plurality of RF couplers for isolating the uplink signals and the downlink signals from each other; and an RF combiner/divider and phase shift network having a plurality of RF combiner/divider and phase shift elements for applying selected phase shifts to the uplink signals and downlink signals.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
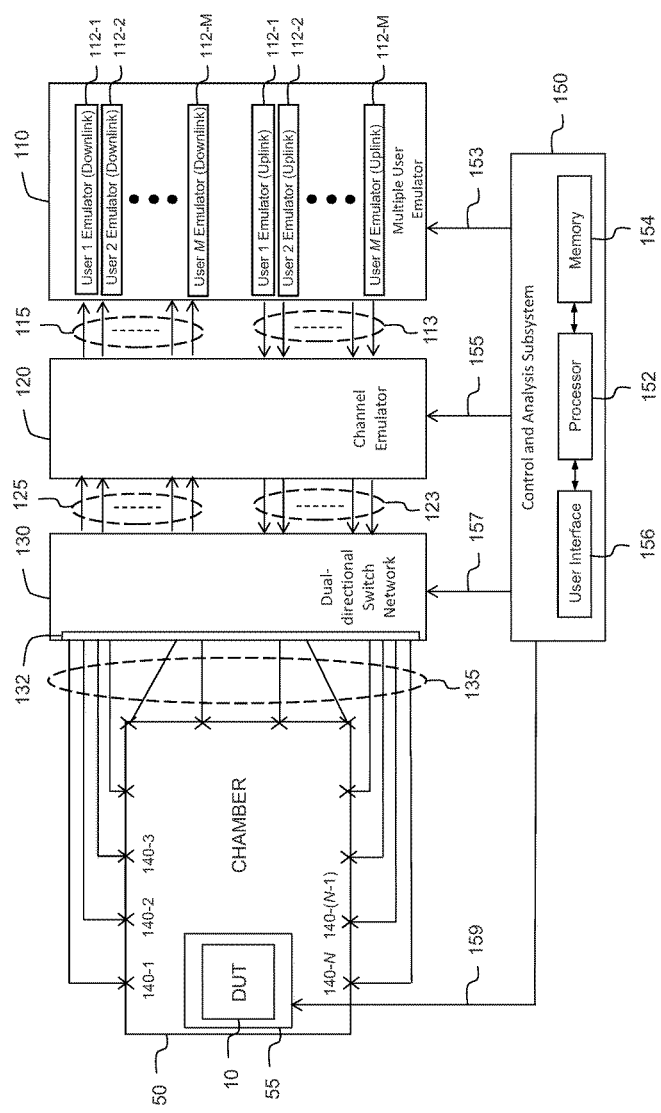
FIG. 1 illustrates an example embodiment of a test system for testing a multi-user, multi-input/multi-output (MIMO) communication system or device under test (DUT).

FIG. 1 illustrates an example embodiment of a test system 100 for testing a multi-user, multi-input/multi-output (MIMO) communication system or device under test (DUT) 10 That is, in the description to follow, DUT 10 is a MIMO DUT.

Here, DUT 10 includes a MIMO transceiver, in particular a MIMO wireless RF transceiver, and a plurality of antennas. In some embodiments, DUT 10 may comprise a base station or repeater for a wireless communication system, such as a mobile telephony system. DUT 10 may include a MIMO baseband module communicating with one or more baseband interfaces of DUT 10, and a MIMO RF module communicating with RF inputs/outputs of DUT 10, which are in turn connected to a corresponding plurality of RF probe antennas for wireless communication. In example embodiments, the baseband interface(s) may comprise one or more electrical and/or optical interfaces.

In some embodiments, DUT 10 comprises a massive MIMO system having a large number of antennas. In some embodiments, DUT 10 may have at least N=64 antennas. In some embodiments, DUT 10 may have N=400 or more antennas.

Test system 100 includes: a multiple-user emulator 110; a channel emulator subsystem 120; and a bi-directional or dual-directional switch network 130. Also provided are N RF probe antennas 140-1, 140-2, 140-3 . . . 140-(N−1), 140-N, and an anechoic chamber 50 into which RF probe antennas 140-1 . . . 140-N are configured to radiate and receive RF signals. In some embodiments, RF probe antennas 140-1 . . . 140-N are mounted or fixed to interior surfaces of the walls of anechoic chamber 50.

As illustrated in FIG. 1, test system 100 further includes a control and analysis subsystem 150 which may load configurations and/or control operations of multiple-user emulator 110, channel emulator subsystem 120, and dual-directional switch network 130. Control and analysis subsystem 150 may include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for controlling operations of test system 100. In some embodiments, control and analysis subsystem 150 may comprise a general purpose computer, such as a personal computer (PC), executing instructions of a software algorithm for performing one or more tests on DUT 10, including measuring or ascertaining one or more performance characteristics of DUT 10.

As illustrated in FIG. 1, control and analysis subsystem 150 includes one or more processor(s) 152, memory 154, and a user interface 156. User interface 156 may include one or more of a display, keyboard, keypad, touchscreen, mouse, trackball, microphone, etc. Although not shown in FIG. 1, control and analysis subsystem 150 further includes one or more input/output ports or communication ports for communicating control signals 153, 155, 157 and 159. Although for ease of illustration FIG. 1 shows control signals 153, 155, 157 and 159 as being communicated via separate interfaces, it should be understood that in some embodiments multiple-user emulator 110, channel emulator subsystem 120, dual-directional switch network 130 and control and analysis subsystem 150 may communicate via a shared communication bus, for example using a standard protocol, such as Ethernet.

Optionally, test system 100 includes a movable mounting structure or movable platform 55 to which DUT 10 is mounted or fixed and by means of which a position and orientation of DUT 10 within anechoic chamber 50 may be adjusted or controlled. In some embodiments, movable platform 55 may be configured to translate, rotate and/or pivot DUT 10 in two or three dimensions in response to one or more control signals, for example one or more control signals 159 from control and analysis subsystem 150.

In some embodiments of test system 100, movable platform 55 may be omitted.

Furthermore, some potential users of test system 100 may already possess an anechoic chamber that is used to test a variety of devices with a variety of test systems and equipment other than the components of test system 100. In that case, a manufacturer or vendor may provide test system 100 to a user or customer without anechoic chamber 50, with the understanding that the user or customer already has an anechoic chamber into which test system 100 may be connected. Similarly, in some cases a user's anechoic chamber may already include a plurality of RF probe antennas suitable for interconnection with dual-directional switch network 130. In that case, a manufacturer or vendor may provide test system 100 to a user or customer without anechoic chamber 50 and without RF probe antennas 140-1 . . . 140-N, with the understanding that the user or customer already has an anechoic chamber and RF probe antennas into which test system 100 may be connected.

Multiple-user emulator 110 emulates transmission and reception operations of a plurality of user terminals which may simultaneously communicate with DUT 10.

Multiple-user emulator 110 may include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for generating a plurality of faded baseband uplink signals to be supplied to DUT 10, as discussed in greater detail below. Multiple-user emulator 110 may also include firmware, one or more application specific integrated circuits (ASICs), digital signal processors (DSPs), programmable gate arrays, etc.

Functionally, multiple-user emulator 110 may be considered as including a plurality of single user emulators 112-1, 112-2 . . . 112-M for emulating M independent user terminals, as shown in FIG. 1. For ease of illustration, the uplink and downlink portions of each of the single user emulators 112-1, 112-2 . . . 112-M are separately shown in FIG. 1.

It should be understood that the functional delineation of multiple-user emulator 110 into a plurality (e.g., M) single user emulators 112 may be achieved in various ways by various concrete implementations. In some implementations, each single user emulator 112 may include its own dedicated individual hardware, firmware and/or software elements—for example its own microprocessor, its own volatile and/or non-volatile memory, etc. In other embodiments, some or all of the single user emulators 112 may share resources, such as a microprocessor, memory, etc. In some embodiments, each single user emulator 112 may represent a software module executing on a common microprocessor or common set of microprocessors and may share common memory.

Figure 2:
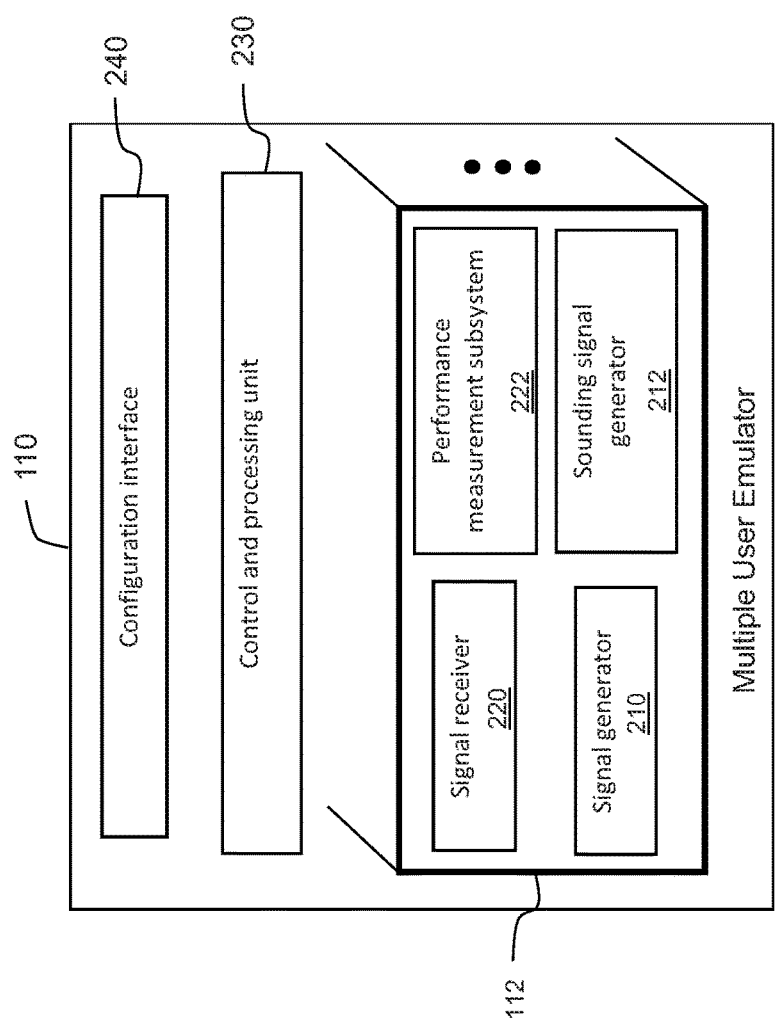
FIG. 2 is a functional block diagram of an example embodiment of a multiple-user emulator which may be included in the test system of FIG. 1.

FIG. 2 is a functional block diagram of an example embodiment of a multiple-user emulator 110. Multiple-user emulator 110 includes a plurality of single user emulators 112. Each single user emulator 112 includes a signal generator 210, a sounding signal generator 212, signal receiver 220, and a performance measurement subsystem 222. Multiple-user emulator 110 also includes a control and processing unit 230 and a configuration interface 240.

Multiple-user emulator 110 is configured to receive one or more control signals 153 from control and analysis subsystem 150 for loading configurations and/or controlling operations of multiple-user emulator 110, as will be discussed in greater detail below.

As illustrated in FIGS. 1 and 2, multiple-user emulator 110, and in particular signal generator(s) 210, is configured to generate and output a plurality of independent uplink signals 113. In the illustrated embodiment, each of the independent uplink signals 113 represents one of a plurality of user uplink signals for DUT 10 which, in operation, may be communicated from corresponding user terminals (e.g., mobile telephones and other wireless communication devices) to DUT 10 wirelessly via one or more RF channels. Since, in operation, user uplink signals from various user terminals are generated independently from each other, in a test mode test system 100, and in particular multiple-user emulator 110, generates independent uplink signals 113 to have characteristics (e.g., data sequences) which are in general independent of each other. For example, in some embodiments, independent uplink signals 113 may include a plurality of different pseudorandom bit streams. In some embodiments, each of the independent uplink signals 113 may be structured as a series of data packets conforming to a communication protocol which is employed by DUT 10. In that case, each of the independent signals may include overhead data and payload data. Overhead data may include packet headers whose formats may be defined by a standard for communication protocol which is employed by DUT 10. In that case, the header format may be the same for all of the independent uplink signals 113. Payload data may include a pseudorandom bit stream, as mentioned above. In some embodiments, multiple-user emulator 110 may generate independent uplink signals 113 by a digital microprocessor executing a software algorithm. In that case, the software algorithm may include one routine to generate a plurality of pseudorandom bit steams as payload data, and may include another routine to encapsulate the payload data into a predefined packet format which is recognized and used by DUT 10.

In some embodiments, independent uplink signals 113 may be RF signals. In other embodiments, independent uplink signals 113 may be baseband signals which are converted to RF signals by channel emulator subsystem 120.

In some embodiments, multiple-user emulator 110, and in particular signal generator(s) 210, may be configured via one or more control signals 153 received from control and analysis subsystem 150 to create independent uplink signals 113 having a format which conforms to a communication protocol employed by DUT 10. In some embodiments, multiple-user emulator 110, and in particular signal generator(s) 210, may be configured via one or more control signals 153 received from control and analysis subsystem 150 with information for one more different layers of an OSI seven layer communication model for defining a communication protocol employed by DUT 10. Various communication protocols may be employed by DUT 10, including protocols which may employ time division duplexing, frequency division duplexing, code division multiple access; various type of modulation (e.g. QPSK, QAM, OFDM); various packet formats; various defined commands and responses; etc. In some embodiments, multiple-user emulator 110, and in particular signal generator(s) 210, may be configured to emulate user equipment supporting one or more of such protocols, with details for configuring multiple-user emulator 110, and in particular signal generator(s) 210, being communicated via one or more control signals 153 received from control and analysis subsystem 150, and received for example by configuration interface 240.

Multiple-user emulator 110, and in particular signal receiver(s) 220, is further configured to receive and process one or more faded downlink signals 115 received from DUT 10 and subjected to the application of downlink fading channel characteristics by channel emulator subsystem 120, as will be discussed in greater detail below. As discussed above with respect to signal generator(s) 210, signal receiver(s) 220 may be configured to receive and process one or more faded downlink signals 115 having a format which conforms to a communication protocol employed by DUT 10. In some embodiments, multiple-user emulator 110, and in particular signal receiver 220, may be configured via one or more control signals 153 received from control and analysis subsystem 150 to emulate user equipment supporting one or more of such protocols, with details for configuring multiple-user emulator 110, and in particular signal receiver(s) 220, being communicated via one or more control signals 153 received from control and analysis subsystem 150, and received for example by configuration interface 240.

In some embodiments, multiple-user emulator 110 may be configured via one or more control signals 153 received from control and analysis subsystem 150 to emulate user equipment including multiple user terminals, whereby one or more independent uplink signals 113 created by multiple-user emulator 110 and one or more received faded downlink signals 115 received by multiple-user emulator 110 depend upon each other. For example, multiple-user emulator 110 may create one or more independent uplink signals 113 in response to one or more received faded downlink signals 115. For example, one or more parameters (such as time slots, modulation format, transmit frequencies, power levels, payload data, etc.) of one or more independent uplink signals 113 may be set by a signal generator 210 of a single user emulator 112 in response to payload data, for example one or more commands or requests, included in a faded downlink signal 115 received by the signal receiver 220 of the same single user emulator 112.

In some embodiments, multiple-user emulator 110, and in particular signal receiver(s) 220, receives faded downlink signal(s) 115 from channel emulator subsystem 120 as faded RF downlink signals, and converts the received faded downlink signal(s) 115 to faded baseband downlink signals. In other embodiments, multiple-user emulator 110, and in particular signal receiver(s) 220, receives faded downlink signal(s) 115 from channel emulator subsystem 120 as faded baseband downlink signals. In that case, in some embodiments channel emulator subsystem 120 may first convert downlink signals 125 received from dual-directional switch network 130 from RF signals to baseband downlink signals, and then apply downlink fading channel characteristics to produce faded downlink signal(s) 115.

Multiple-user emulator 110, and in particular performance measurement subsystem(s) 222, is further configured to receive processed downlink data from signal receiver(s) 220 to measure one or more performance characteristics of DUT 10. Such performance characteristic(s) may include: a signal-to-interference-and-noise ratio (SINR), a signal-to-noise ratio, a bit error rate (BER), a block error rate (BLER), a peak and/or average data throughput, and/or a packet error rate for one or more emulated user terminals, and/or an overall system throughput of DUT 10 and interference between different emulated user terminals. It should be understood that in some embodiments, measurement or determination of other characteristics of DUT 10 may be obtained from payload data included in the received faded downlink signal(s) 115. For example, in some embodiments payload data information created by DUT 10 and included in one or more received faded downlink signal(s) 115 may include data which may indicate one or more performance characteristics of DUT 10 according to a protocol employed by DUT 10. For example, in some embodiments, in operation DUT 10 may exercise some power level control with respect to user equipment via commands included in the payload of a downlink signal transmitted by DUT 10 to the user equipment. In that case, one or more performance characteristics of DUT 10 in response to a plurality of independent uplink signals 113 may be determined from the power level command which DUT 10 includes in a faded downlink signal 115 received by multiple-user emulator 110.

Some embodiments of DUT 10 may operate according to a communication protocol wherein a predetermined training or sounding sequence may be transmitted by a user terminal with which it communicates, for example periodically at a defined repetition rate. In that case, DUT 10 may compare the training or sounding sequence received from a user terminal via an unknown multipath channel with the known predetermined sequence, and thereby may derive one or more characteristics of the unknown multipath channel. Accordingly, multiple-user emulator 110 may further include a sounding signal generator 212 for transmitting the training or sounding sequence according to the protocol(s) employed by DUT 10.

Channel emulator subsystem 120 may include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for applying selected fading characteristics to independent uplink signals 113 and downlink signals 125, as discussed in greater detail below. Channel emulator subsystem 120 may also include firmware, one or more application specific integrated circuits (ASICs), digital signal processors (DSPs), programmable gate arrays, etc. Channel emulator subsystem 120 may further include RF circuits, such as amplifiers, attenuators, phase shifters, signal combiners, etc. to apply selected fading characteristics to independent uplink signals 113 and downlink signals 125, as will be discussed in greater detail below.

Channel emulator subsystem 120 can be configured as multiple pairs of unidirectional channel emulators (each pair including an uplink channel emulator and a downlink channel emulator) or can be configured as multiple dual-directional channel emulators for each of the user terminals emulated by a single user emulator 112 of multiple-user emulator 110. Regardless of the configuration, the uplink and downlink channel emulators for each single user emulator 112 should be synchronized. The pair of the channel emulators, or the dual-directional channel emulator, is used to emulate the uplink and downlink channel effects for a single user emulator 112. For the case of a TDD test, the uplink and the downlink channel model for each user emulator 112 may be reciprocal. For the case of an FDD test, the uplink and the downlink channel models for each user emulator 112 may be configured to be the same as each other or different from each other.

Figure 3:
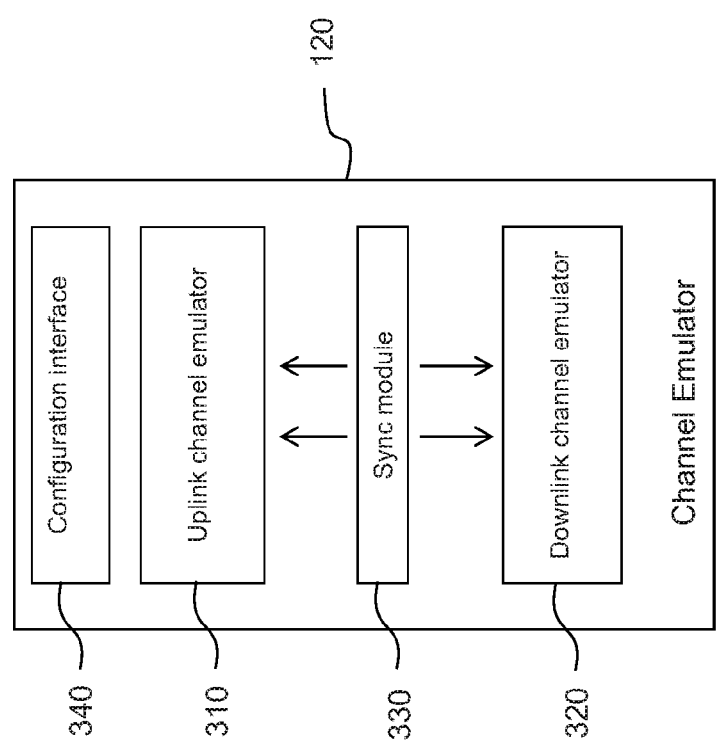
FIG. 3 is a functional block diagram of an example embodiment of a channel emulator which may be included in the test system of FIG. 1.

FIG. 3 illustrates an example embodiment of a channel emulator subsystem 120. Channel emulator subsystem 120 includes an uplink channel emulator 310, a downlink channel emulator 320, a sync module 330, and a configuration interface 340.

Channel emulator subsystem 120, and in particular configuration interface 340, is configured to receive one or more control signals 153 from control and analysis subsystem 150 for loading configurations and/or controlling operations of channel emulator subsystem 120, as will be discussed in greater detail below.

Channel emulator subsystem 120, and in particular uplink channel emulator 310, is configured to apply selected uplink fading channel characteristics to independent uplink signals 113 to generate a plurality of faded independent uplink signals (e.g., RF uplink signals) 123.

In some embodiments, the uplink fading channel characteristics may be determined or selected by control and analysis subsystem 150 (i.e., by a user of control and analysis subsystem 150 via user interface 156) and provided therefrom to multiple-user emulator 110. The uplink fading channel characteristics may represent data determined from experiments or computer models to represent typical fading characteristics to which user data is exposed when being communicated wirelessly from a user terminal (e.g., a mobile telephone) to DUT 10. For example, in some embodiments some or all of the uplink fading channel characteristics may reflect a Rayleigh fading model for a communication channel between a transmit antenna of a user terminal (e.g., a mobile telephone or other wireless communication device) and an antenna of DUT 10 which receives the signal. In some embodiments, a plurality of different possible fading channel characteristics may be stored in memory in channel emulator subsystem 120, and channel emulator subsystem 120 may select the uplink fading channel characteristics to be applied to each of the independent uplink signals 113 from the fading channel characteristics stored in memory. In some embodiments, channel emulator subsystem 120 may receive the selected uplink fading channel characteristics from control and analysis subsystem 150.

In some embodiments, for each pair of channel emulators or each dual-directional channel emulator, configuration interface 340 may be employed to configure the channel model to be used. In some embodiments, channel model parameters such as the number of paths, power delay profiles, power levels, SNR, etc. can be configured via configuration interface 340. In some embodiments, this configuration may be based on parameters included in the one or more control signals 155 received from control and analysis subsystem 150. The channel model configuration for each pair of channel emulators or each dual-directional channel emulator for each user emulator 112 can be configured independently.

In some embodiments, independent uplink signals 113 may be RF signals. In that case, channel emulator subsystem 120, and in particular uplink channel emulator 310, may process each of independent uplink signals 113 through an RF signal processor which may include a combination of one or more signal splitters, programmable attenuators or amplifiers, programmable phase shifters, and one or more signal combiners to generate a plurality of faded independent uplink signals 123.

In other embodiments, independent uplink signals 113 may be baseband signals which are converted to RF signals by channel emulator subsystem 120. In that case, channel emulator subsystem 120, and in particular uplink channel emulator 310, may process each of independent uplink signals 113 through a baseband signal processor which processes independent uplink signals 113 to simulate the effects of a fading channel, and then converts the processed independent baseband uplink signals to generate the plurality of faded independent uplink signals 123.

In some embodiments, a user may execute one or more software algorithms stored in memory and/or data storage of control and analysis subsystem 150 to design or set parameters for the independent uplink signals 113, uplink fading channel characteristics, downlink fading channel characteristics, downlink signals 125, and various combinations of RF probe antennas 140-1 . . . 140-N or RF ports 132 to be employed for the plurality of faded independent uplink signals and for the downlink signals transmitted by DUT 10.

In some embodiments, control and analysis subsystem 150 may communicate any or all of the data and parameters necessary for operation of multiple-user emulator 110, channel emulator subsystem 120, and dual-directional switch network 130 on an as-needed basis. In some embodiments, all of the data and parameters necessary for operation of multiple-user emulator 110, channel emulator subsystem 120, and dual-directional switch network 130 may be stored in nonvolatile memory in multiple-user emulator 110, channel emulator subsystem 120, and dual-directional switch network 130, respectively.

Beneficially, channel emulator subsystem 120 may be configured (for example by control and analysis subsystem 150) such that the downlink fading channel characteristics which are applied by downlink channel emulator 320 to the downlink signals 125 are derived from the uplink fading channel characteristics which are applied by channel emulator subsystem 120 to independent uplink signals 113. In particular, in some cases the downlink fading channel characteristics which are applied to output signals of DUT 10 by channel emulator subsystem 120 may be the reciprocal or inverse of the first fading channel characteristics. Toward this end, channel emulator subsystem 120 includes a sync module 330 which syncs the fading channel characteristics which are employed by uplink channel emulator 310 and downlink channel emulator 320.

Channel emulator subsystem 120 outputs one or more faded downlink signals 115 to multiple-user emulator 110.

Control and analysis subsystem 150 may be connected to each of the baseband test instrument(s) 142, RF test instrument(s) 144, and optional baseband test instrument(s) 146 and thereby may control one or more operating parameters of these instruments in a test mode, including for example programming the instruments to perform a variety of operations as desired to implement one or more tests to measure one or more performance characteristics of DUT 10. Control and analysis subsystem 150 may execute one or more software routines to cause test system 100 to perform desired tests on DUT 10.

In some embodiments, some or all of the elements of multiple-user emulator 110 and channel emulator subsystem 120 may be combined into a single physical unit, which may share some common elements or components, such as one or more shared digital microprocessors, shared memory, shared firmware elements, etc. In that case, in general, multiple-user emulator 110 and channel emulator subsystem 120 may be considered to comprise one or more signal processors which are configured: to generate a plurality of faded independent uplink signals; to apply corresponding downlink fading channel characteristics to at least one of the downlink signals, to produce therefrom at least one faded downlink signal, and to measure at least one performance characteristic of DUT 10 from the at least one faded downlink signal.

Dual-directional switch network 130 includes a plurality of RF ports 132 for connection to corresponding RF probe antennas 140-1 . . . 140-N via a plurality of RF interfaces (e.g., including RF cables) 135. In different embodiments, dual-directional switch network 130 may include various different kinds of interfaces for connection with channel emulator subsystem 120, such as RF interface(s), optical interface(s), or baseband interface(s). For different interfaces, proper signal conversion modules are included in dual-directional switch network 130 to convert faded independent uplink signals 123 into appropriate RF signals to be provided to RF ports 132.

In operation, dual-directional switch network 130 receives faded independent uplink signals 123 and provides each of the faded independent uplink signals 123 to a group of one or more of the RF ports 132 at selected levels as determined by one or more control signals 157 from control and analysis subsystem 150. That is to say, dual-directional switch network 130 provides each of the faded independent uplink signals 123 to a group of RF probe antennas 140-1 . . . 140-N via corresponding ones of the RF ports 132 in response to one or more control signals 157 from control and analysis subsystem 150. Here it should be understood that the RF ports 132 and RF probe antennas 140-1 . . . 140-N assigned to be in the groups for each of the faded independent uplink signals 123 are not mutually exclusive. That is the say that any one or more of the RF ports 132 and RF probe antennas 140-1 . . . 140-N may, in general, transmit two, or three, or more of the faded independent uplink signals 123. Also, in general, the levels at which any of the faded independent uplink signals 123 are provided to the various RF ports 132 may not all be the same, but may vary from RF port 132 to RF port 132, and accordingly from RF probe antenna to RF probe antenna.

Test system 100 can emulate uplink signals arriving at DUT 10 from different directions for multiple users. DUT 10 performs a pre-coding process based on the received uplink signals received from RF probe antennas 140-1 . . . 140-N, and in response thereto generates one or more downlink signals which is/are received by RF probe antennas 140-1 . . . 140-N.

Beneficially, dual-directional switch network 130 is configured such that the downlink switching configuration has the same configuration as the uplink switching configuration which is used to map each downlink signal to a corresponding user emulator 112. For example if the faded independent uplink signal 123 produced from the independent uplink signal 113 from single user emulator 112-1 is fed to RF probe antennas 140-1, 140-2 and 140-5, then the received RF downlink signals at the same RF probe antennas 140-1, 140-2 and 140-5 are selected to feed into the faded downlink signal 115 for single user emulator 112-1 via dual-directional switch network 130 and channel emulator subsystem 120.

Figure 4:
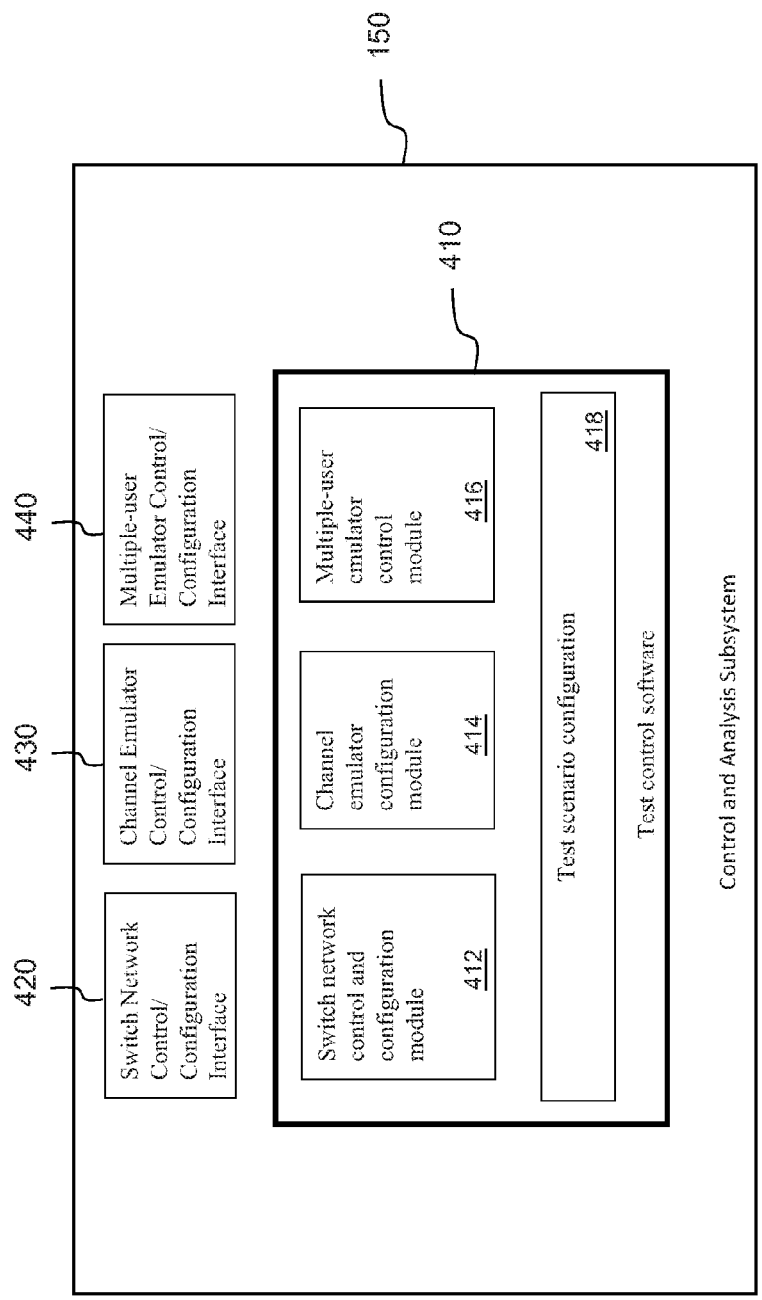
FIG. 4 is a functional block diagram of an example embodiment of a control and analysis subsystem which may be included in the test system of FIG. 1.

FIG. 4 is a functional block diagram of an example embodiment of control and analysis subsystem 150 which may be included in the test system of FIG. 1. Control and analysis subsystem 150 includes test control software 410, a switch network control/configuration interface 420, a channel emulator control/configuration interface 430 and a multiple-user emulator control/configuration interface 440. Switch network control/configuration interface 420, channel emulator control/configuration interface 430 and multiple-user emulator control/configuration interface 440 are configured to be interfaced with dual-directional switch network 130, channel emulator subsystem 120, and multiple-user emulator 110, respectively, for example to provide control signals 157, 155 and 143. Test control software 410 includes switch network control and configuration module 412, channel emulator configuration module 414, and multiple-user emulator control module 416.

In some cases, it may be necessary or desirable to test a multi-user, multi-input/multi-output (MIMO) communication system without the use of an anechoic chamber.

Figure 5:
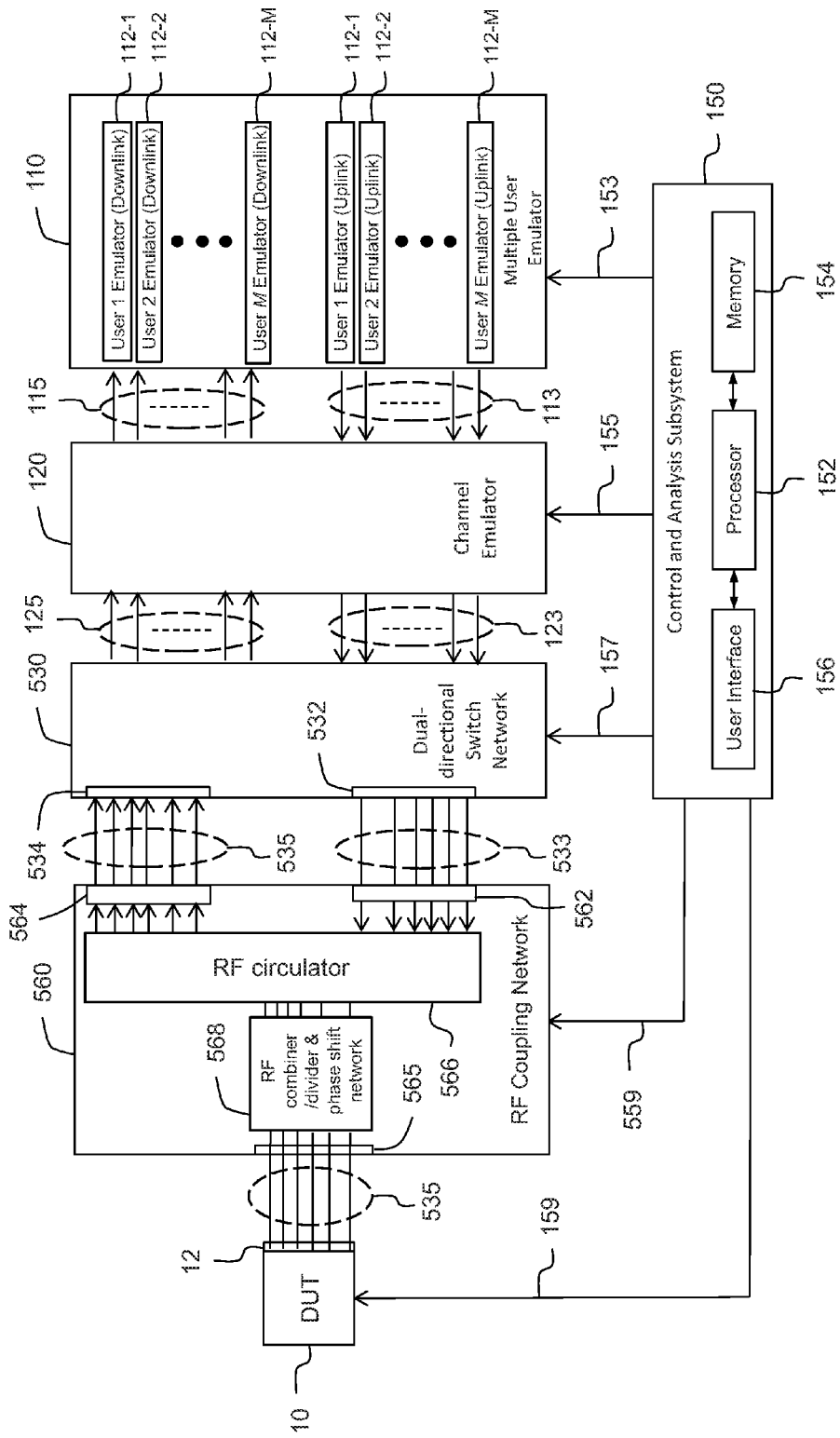
FIG. 5 illustrates another example embodiment of a test system for testing a multi-user, multi-input/multi-output (MIMO) communication system or device under test (DUT).

FIG. 5 illustrates another example embodiment of a test system 500 for testing a multi-user, multi-input/multi-output (MIMO) communication system or device under test (DUT) 10. Test system 500 is similar to test system 100, so only differences therebetween will be discussed.

In lieu of the anechoic chamber 50 with which test system 100 operates, test system 500 includes an RF coupling network 560 for coupling RF signals between dual-directional switch network 130 and RF input/output (I/O) terminals 12 of DUT 10. Here, RF I/O terminals 12 may comprise connectors by which DUT 10 would operationally be connected to RF antennas. However, with test system 500 the RF antennas for DUT 10 are not employed, and instead RF uplink signals and RF downlink signals are coupled to and from DUT 10 via RF I/O terminals 12.

Furthermore, test system 500 includes dual-directional switch network 530 in place of dual-directional switch network 130. A principle difference between dual-directional switch network 530 in place of dual-directional switch network 130 is that dual-directional switch network 530 includes separate RF output ports 532 and RF input ports 534 in place of RF ports 132.

RF coupling network 560 comprises an RF circulator subsystem 566 and an RF combiner/divider and phase shift network 568. RF coupling network 560 further includes a plurality of RF input ports 562 which are connected to RF output ports 532 of dual-directional switch network 530, and a plurality of RF output ports 564 which are connected to RF input ports 534 of dual-directional switch network 530.

Operationally, RF coupling network 560 couples RF uplink signals 533 received from RF output ports 532 of dual-directional switch network 530 to one or more RF input/output (I/O) terminals 12 of DUT 10 via DUT interface ports 565, with selected phase shifts applied to each RF uplink signal by RF combiner/divider and phase shift network 568 to emulate different phase shifts which would occur if the signals were being provided to DUT 10 via antennas over the air. RF coupling network 560 further couples RF signals received at DUT interface ports 565 from DUT 10, via the one or more RF input/output (I/O) terminals 12, to RF input ports 534 of dual-directional switch network 530 as RF downlink signals 535, with selected phase shifts applied to each RF downlink signal by RF combiner/divider and phase shift network 568 to emulate different phase shifts which would occur if the signals were being received from DUT 10 via antennas over the air. Control and analysis subsystem 150 configures or controls RF coupling network 560, and particularly RF combiner/divider and phase shift network 568, to select the phase shifts which are applied to the various RF uplink and RF downlink signals, via control signal(s) 559.

Figure 6:
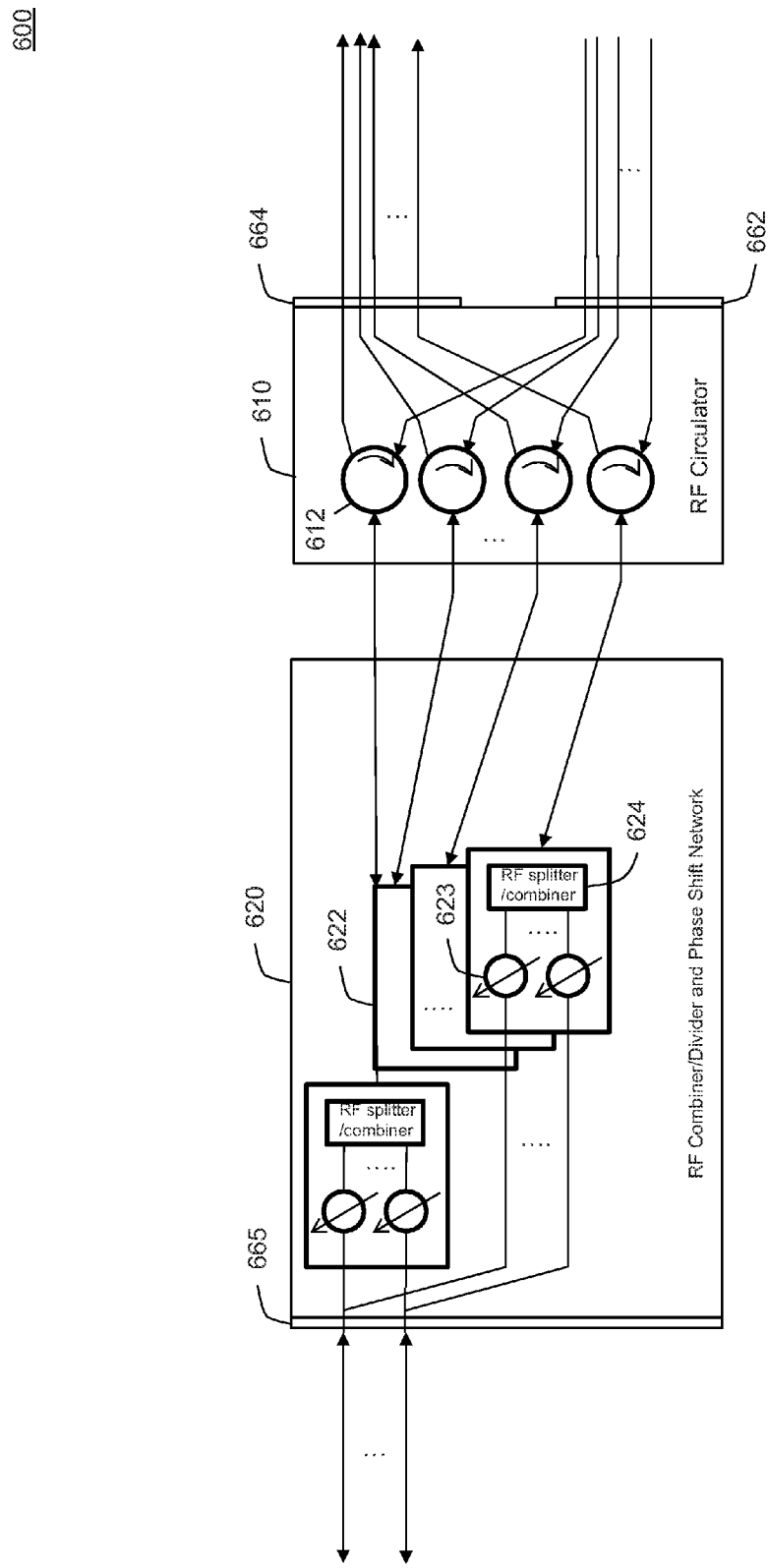
FIG. 6 illustrates an example embodiment of an RF divider and phase shift network which may be included in the test system of FIG. 5.

FIG. 6 illustrates an example embodiment of an RF coupling network 600 which may be one embodiment of RF coupling network 560 of test system 500. RF coupling network 600 includes an RF circulator subsystem 610 and an RF combiner/divider and phase shift network 620. RF circulator subsystem 610 includes a plurality of three-port RF circulators 612. RF combiner/divider and phase shift network 620 includes a plurality of three-port RF combiner/divider and phase shift elements 622, each having a first port which is connected to one port of a corresponding one of the three port RF circulators 612, and having two additional ports which are connected to DUT interface ports 665. Each RF combiner/divider and phase shift element 622 includes one two-way RF combiner (also referred to as an RF divider or RF splitter) 624 and two individually controllable RF phase shifters 623. Meanwhile, the other two ports of each of the three port RF circulators 612 are connected to corresponding RF input ports 662 and RF output ports 664. RF circulators 612 serve to isolate the RF uplink signals received at RF input ports 662 from the RF downlink signals output to RF output ports 664. The constructions and operations of RF phase shifters, RF combiners, and RF circulators are well known to those skilled in the art and will not be detailed here.

Operationally, RF coupling network 600 couples RF uplink signals received via RF input ports 662 to RF combiner/divider and phase shift elements 622, which apply selected phase shifts to the signals and then provide the phase shifted RF uplink signals to DUT interface ports 665. RF coupling network 560 further couples RF signals received at DUT interface ports 665 to RF combiner/divider and phase shift elements 622, which apply selected phase shifts to the signals and then provide the phase shifted RF downlink signals to RF output ports 664.

Many variations in the structural configuration of RF coupling network 560 besides those illustrated in FIG. 6 are envisioned while maintaining the same functionality. For example, in other embodiments each RF combiner/divider and phase shift element 622 may combine and apply select phase shifts to more than two RF uplink and downlink signals. In still other embodiments, the order of the RF circulator subsystem and the RF combiner/divider and phase shift network may be reversed, with the DUT interface port connected to the RF circulator subsystem, and the RF input ports and RF output ports coupled to the RF combiner/divider and phase shift network.

Figure 7:
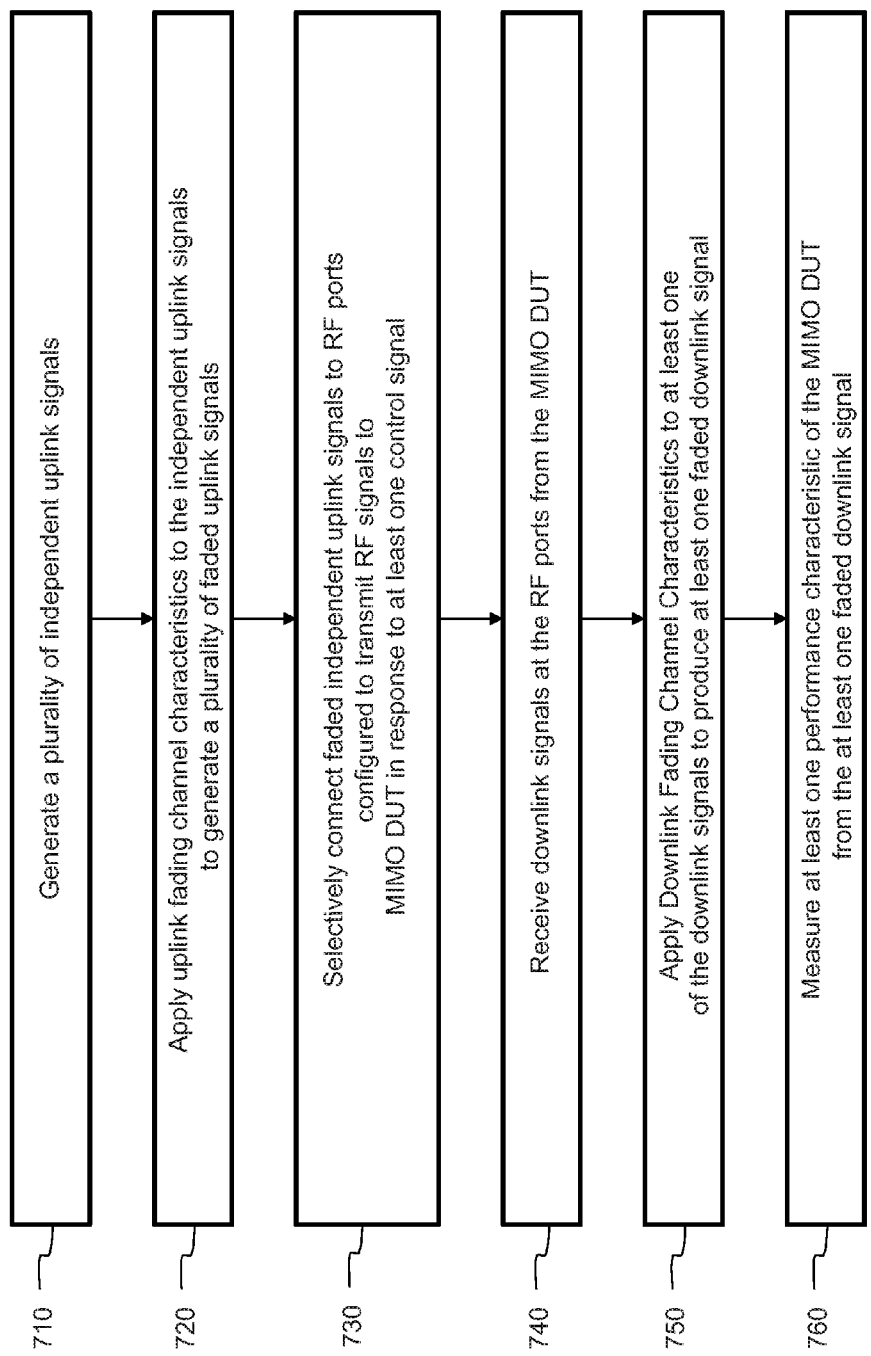
FIG. 7 is a flowchart of an example embodiment of a method of testing a MIMO communication system or DUT.

FIG. 7 is a flowchart of an example embodiment of a method 700 of testing a MIMO communication system or DUT, such as DUT 10.

In an operation 710, a test system (e.g., test system 100 or test system 500) generates a plurality of independent uplink signals (e.g., independent uplink signals 113).

In an operation 720, a test system (e.g., test system 100 or test system 500) applies a plurality of uplink fading channel characteristics to the independent uplink signals 113. For example, in some embodiments, control and analysis subsystem 150 selects a plurality of uplink fading channel characteristics and communicates them to channel emulator subsystem 120, for example under user control via user interface 156 of control and analysis subsystem 150 or automatically under control of a software routine executed by control and analysis subsystem 150. In other embodiments, a plurality of possible uplink fading channel characteristics may be stored in memory of channel emulator subsystem 120 and uplink fading channel characteristics for each of the independent uplink signals 113 may be selected from those stored in memory by a digital microprocessor of channel emulator subsystem 120 executing a software algorithm.

In an operation 730, a test system (e.g., test system 100) selectively connects the plurality of faded independent uplink signals to a plurality of RF ports configured to transmit RF signals to DUT 10 in response to at least one control signal. For example, in some embodiments of test system 100, control and analysis subsystem 150 configures or controls dual-directional switch network 130 via control signal(s) 157 to route each of the plurality of faded independent uplink signals to a selected combination of RF ports 132 so as to be connected to corresponding ones of RF probe antennas 140-1 . . . 140-N.

In an operation 740, a test system (e.g., test system 100) receives at a plurality of RF ports a plurality of downlink signals from DUT 10. For example, in some embodiments of test system 100, RF probe antennas 140-1 . . . 140-N receive RF signals transmitted by DUT 10 and provide the received RF signals to RF ports 132 of dual-directional switch network 130.

In an operation 750, a test system (e.g., test system 100) applies downlink fading channel characteristics to at least one of the downlink signals, to produce therefrom at least one faded downlink signal. For example, in some embodiments, control and analysis subsystem 150 selects a plurality of downlink fading channel characteristics and communicates them to channel emulator subsystem 120, for example under user control via user interface 156 of control and analysis subsystem 150 or automatically under control of a software routine executed by control and analysis subsystem 150. In other embodiments, a plurality of possible downlink fading channel characteristics may be stored in memory of channel emulator subsystem 120 and downlink fading channel characteristics for each of the independent uplink signals 113 may be selected from those stored in memory by a digital microprocessor of channel emulator executing a software algorithm. Here, the downlink fading channel characteristics may be derived from the uplink fading channel characteristics. In some embodiments, the downlink fading channel characteristics may be the reciprocal or inverse of the uplink fading channel characteristics.

In an operation 760, a test system (e.g., test system 100) measures at least one performance characteristic of DUT 10 from the at least one faded downlink signal. In some embodiments, the at least one performance characteristic may include an output power level, an occupied bandwidth, a signal-to-noise ratio (SNR), a harmonic output level, a harmonic distortion, a signal-to-noise-plus-interference ratio (SNIR), a bit error rate (BER), etc. of an output signal of DUT 10.

With test system 100 and test system 500 as described above, the number of channel emulators required can be constrained to a reasonable number. For example if DUT 10 has 256 antenna elements (and/or 256 corresponding RF I/O terminals 12), if one used a traditional test method to emulate one-directional channels between DUT 10 and each user terminal equipped with only one single antenna, the number of channel emulators should be 256 for each user terminal. If a test is intended to emulate the performance of DUT 10 when there are 12 individual user terminals, then the number of channel emulators required should be 256× 12=3072. This large number of channel emulators would present significant implementation complexity challenges. In contrast, for example in test system 100 which couples the faded signals from each user terminal to DUT 10 via RF radiation using RF probe antennas 140-1 . . . 140-N, the required number of channel emulators may be determined by the number (N) of user terminals being emulated and the number of RF probe antennas 140-1 . . . 140-N, which does not cause the number of channel emulators to increase as the number of antennas employed by DUT 10 increases. For example, in a case where it is assumed that there is only one cluster from each user terminal being transmitted toward DUT 10, then the number of uplink channel emulators is only 12, which is significantly less than 3072.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method of testing a multi-input, multi-output (MIMO) device under test (DUT), the method comprising:
generating a plurality of independent uplink signals;
applying corresponding uplink fading channel characteristics to each of the independent uplink signals to generate a plurality of faded independent uplink signals;
selectively connecting the plurality of faded independent uplink signals to a plurality of RF ports configured to transmit RF signals to at least one of a plurality of inputs of the MIMO DUT in response to at least one control signal;
receiving at the plurality of RF ports a plurality of downlink signals from the MIMO DUT;
applying downlink fading channel characteristics to at least one of the downlink signals, to produce therefrom at least one faded downlink signal; and
measuring at least one performance characteristic of the MIMO DUT from the at least one faded downlink signal, wherein the plurality of independent uplink signals are baseband signals, and wherein applying corresponding uplink fading channel characteristics to each of the independent uplink signals to generate a plurality of faded independent uplink signals comprises:
converting the plurality of baseband independent uplink signals to a plurality of plurality of independent RF uplink signals; and
applying the corresponding uplink fading channel characteristics to each of the plurality of independent RF uplink signals to generate the plurality of faded independent uplink signals.

2. The method of claim 1, further comprising applying different uplink fading channel characteristics to each of the independent uplink signals to generate the plurality of faded independent uplink signals.

3. The method of claim 2, further comprising:
supplying the plurality of faded independent uplink signals from the plurality of RF ports to a plurality of probe antennas via a corresponding plurality of RF cables; and
transmitting the plurality of faded independent uplink signals wirelessly from the probe antennas to the MIMO DUT.

4. The method of claim 3, further comprising supplying a first one of the plurality of faded independent uplink signals to a first group of the plurality of probe antennas, and supplying a second one of the plurality of faded independent uplink signals to a second group of the plurality of probe antennas, wherein at least one of the probe antennas included in the first group is not included in the second group.

5. The method of claim 3, wherein the MIMO DUT is disposed within an anechoic chamber, the method further comprising transmitting the plurality of faded independent uplink signals wirelessly from the probe antennas to the MIMO DUT within the anechoic chamber.

6. The method of claim 5, further comprising:
receiving at the probe antennas the plurality of downlink signals transmitted wirelessly from the MIMO DUT within the anechoic chamber; and
supplying the plurality of downlink signals from the plurality of probe antennas to the plurality of RF ports via the corresponding plurality of RF cables.

7. The method of claim 1, wherein the downlink fading channel characteristics applied to at least one of the downlink signals are the same as the uplink fading channel characteristics applied to a corresponding one of the independent uplink signals.

8. The method of claim 7, wherein the at least one characteristic of the corresponding one of the plurality of independent uplink signals includes a modulation type employed to generate the corresponding one of the plurality of independent uplink signals.

9. The method of claim 1, further comprising:
extracting data from the at least one of the downlink signals; and
adjusting at least one characteristic of a corresponding one of the plurality of independent uplink signals in response to the extracted data.

10. The method of claim 1, wherein measuring at least one performance characteristic of the MIMO DUT includes measuring at least one of: a signal-to-interference-and-noise ratio (SINR), a signal-to-noise ratio, a bit error rate (BER), a block error rate (BLER), a data throughput, and a packet error rate for the at least one of the downlink signals.

11. A test system for testing a multi-input, multi-output (MIMO) device under test (DUT), the MIMO DUT, the test system comprising:
one or more signal processors configured to generate a plurality of faded independent uplink signals;
a switch network including,
a plurality of first ports connected to the one or more signal processors and configured to receive the plurality of faded independent uplink signals,
at least one switch, and
a plurality of second ports configured to transmit RF uplink signals to the MIMO DUT,
and at least one control input configured to receive at least one control signal for controlling the at least one switch to selectively supply to the second ports the plurality of faded independent uplink signals received at the plurality of first ports,
wherein the switch network is further configured to receive at the plurality of second ports a plurality of downlink signals from the MIMO DUT and to selectively provide the downlink signals to the first ports in response to at least one control signal, and
wherein the one or more signal processors are further configured to apply corresponding downlink fading channel characteristics to at least one of the downlink signals, to produce therefrom at least one faded downlink signal, and to measure at least one performance characteristic of the MIMO DUT from the at least one faded downlink signal.

12. The test system of claim 11, wherein the MIMO DUT has a plurality of antennas, the test system further comprising a plurality of probe antennas which are arranged to transmit the RF uplink signals to at least one of the plurality of antennas of the MIMO DUT.

13. The test system of claim 12, wherein the plurality of probe antennas are arranged to transmit the RF uplink signals to the plurality of antennas of the MIMO DUT within an anechoic chamber.

14. The test system of claim 11, wherein the one or more signal processors comprise:
a multi-user signal emulator configured to generate a plurality of independent baseband uplink signals; and
a channel emulator configured to convert the independent baseband uplink signals to independent RF uplink signals, and to apply corresponding uplink fading channel characteristics to each of the independent RF uplink signals to generate the plurality of faded independent uplink signals.

15. The test system of claim 11, wherein the one or more signal processors comprise:
a multi-user signal emulator configured to generate a plurality of independent baseband uplink signals; and
a channel emulator configured to apply corresponding uplink fading channel characteristics to the independent baseband uplink signals to generate a plurality of faded independent baseband uplink signals, and to convert the faded independent baseband uplink signals to RF frequencies to produce the plurality of faded independent uplink signals.

16. The test system of claim 11, wherein the one or more signal processors comprise:
a multi-user signal emulator configured to generate a plurality of independent baseband uplink signals, wherein the multi-user signal emulator includes:
a signal generator configured to generate a plurality of independent baseband uplink signals;
a signal receiver configured to receive the at least one faded downlink signal; and
a performance measurement subsystem configured to measure at least one performance characteristic of the MIMO DUT from the at least one faded downlink signal.

17. The test system of claim 11, wherein the multi-user signal emulator further includes a sounding signal generator configured to generate a sounding signal to be transmitted to the MIMO DUT, the sounding signal being usable by the MIMO DUT to determine uplink fading channel characteristics for at least one of the faded independent uplink signals.

18. The test system of claim 11, further comprising a controller comprising:
   a processor; and
   memory storing instructions for causing the processor to control at least one operating parameter of the one or more signal processors and at least one operating parameter of the switch network.

19. The test system of claim 18, wherein the controller further comprises a graphical user interface configured to receive user input from a user and in response to the user input to control the at least one operating parameter of the one or more signal processors and the at least one operating parameter of the switch network.

20. The test system of claim 11, wherein the MIMO DUT has a plurality of RF input/output terminals, the test system further comprising an RF coupling network connected to the first ports and second ports of the switch network and further configured to be connected to the RF input/output terminals of the MIMO DUT, wherein the RF coupling network is configured to couple the RF uplink signals from the switch network to the RF input/output terminals of the MIMO DUT, and is further configured to couple the plurality of downlink signals from the MIMO DUT to the switch network.

21. The test system of claim 20, wherein the RF coupling network comprises:
   an RF coupler subsystem comprising a plurality of RF couplers for isolating the uplink signals and the downlink signals from each other; and
   an RF combiner/divider and phase shift network having a plurality of RF combiner/divider and phase shift elements for applying selected phase shifts to the uplink signals and downlink signals.

* * * * *